UNITED STATES PATENT OFFICE.

PAUL REHLÄNDER, OF CHARLOTTENBURG, GERMANY, ASSIGNOR TO CHEMISCHE FABRIK AUF ACTIEN (VORM. E. SCHERING), OF BERLIN, GERMANY.

VANADIUM ACID OXALATE AND PROCESS OF MAKING SAME.

979,887.     Specification of Letters Patent.     Patented Dec. 27, 1910.

No Drawing.     Application filed September 20, 1909. Serial No. 518,556.

*To all whom it may concern:*

Be it known that I, PAUL REHLÄNDER, doctor of philosophy, chemist, citizen of the German Empire, residing at Charlottenburg, near Berlin, German Empire, have invented a new and useful Improvement in Vanadium Acid Oxalate and Processes of Making the Same, of which the following is a specification.

Toning salts in solid or tablet form have heretofore been made for uranium tonings, giving a red or brown tone, and for iron blue and iron green tonings. Vanadium green tonings for which vanadium chlorid is used could not be manufactured in solid form because vanadium chlorid, $VaCl_2$, is either liquid or strongly hygroscopic, as are also other known vanadium compounds of similar constitution.

I have found that a solid substance suitable for vanadium green tonings can be produced from vanadium chlorid by subjecting the same to the action of anhydrous oxalic acid. The hydrochloric acid which is bound in the vanadium chlorid is thereby liberated and a solid non-hygroscopic substance results which resists atmospheric influences, which keeps well and can readily be put up in the form of tablets for use. This substance is easily soluble in water or alcohol, producing a blue solution, and gives gas light and bromid papers a fine green tone by adding iron oxalate, oxalic acid and red prussiate of potash.

Example: 500 grams of the liquid vanadium chlorid are mixed at a temperature of from 15° to 20° C. with 1.35 kilograms of anhydrous oxalic acid; the mixture is at first pastelike but by and by under strong development of hydrochloric acid gas forms a dry mass which keeps unchanged and can easily be pressed in tablet form. Any hydrochloric acid remaining in the mass should be neutralized by means of caustic lime. The exact constitution of the resulting substance is not known but it is probable that it is an acid vanadium oxalate, $Va(C_2O_4H)_2$. It is a dry, friable, non-hygroscopic substance of gray-green color which is soluble in water or alcohol with a blue color.

A green toning solution is made by dissolving, for instance, 3.8 grams of the above mentioned preparation, or 20 tablets of 0.19 gram each, in 1 liter of water, adding 1½ grams of anhydrous oxalic acid, 1 gram of iron oxalate and 1 gram of red prussiate of potash. A bath in this solution gives gas light or bromid papers a green tone within three to five minutes.

I claim as my invention:

1. The process of manufacturing a solid preparation for vanadium green tonings which consists in subjecting vanadium chlorid to the action of anhydrous oxalic acid.

2. The herein described vanadium compound, suitable for vanadium green tonings, the same being the product of the action of anhydrous oxalic acid upon vanadium chlorid, and being a dry, friable, non-hygroscopic substance of gray-green color which is soluble in water and in alcohol with a blue color.

In testimony whereof I have hereunto set my signature in the presence of two subscribing witnesses.

PAUL REHLÄNDER.

Witnesses:
     HENRY HASPER,
     WOLDEMAR HAUPT.